(12) United States Patent
Andrew

(10) Patent No.: US 6,389,074 B1
(45) Date of Patent: May 14, 2002

(54) METHOD AND APPARATUS FOR DIGITAL DATA COMPRESSION

(75) Inventor: James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,398

(22) Filed: Sep. 28, 1998

(30) Foreign Application Priority Data

Sep. 29, 1997 (AU) ................................. PO9512

(51) Int. Cl.[7] .............................. H04N 7/50; H04N 7/30
(52) U.S. Cl. ............................ 375/240.05; 375/240.12; 375/240.19
(58) Field of Search .................. 348/403; 375/240.19, 375/240.03, 240.04, 240.05, 240.12; 709/247

(56) References Cited

U.S. PATENT DOCUMENTS

| | | | | |
|---|---|---|---|---|
| 5,446,806 A | * | 8/1995 | Ran et al. | 382/240 |
| 5,812,788 A | * | 9/1998 | Agarwal | 709/247 |
| 5,835,147 A | * | 11/1998 | Florentin et al. | 375/240.12 |
| 5,841,473 A | * | 11/1998 | Chui et al. | 375/240.11 |
| 5,848,195 A | * | 12/1998 | Romriell | 382/246 |
| 5,917,943 A | * | 6/1999 | Washizawa | 382/190 |
| 5,937,097 A | * | 8/1999 | Lennon | 382/236 |
| 6,084,908 A | * | 7/2000 | Chiang et al. | 375/240.03 |
| 6,160,846 A | * | 12/2000 | Chiang et al. | 375/240.05 |
| 6,195,456 B1 | * | 2/2001 | Balasubramanian et al. | 382/167 |

OTHER PUBLICATIONS

Bruce et al., "Wavelet Analysis", IEEE Spectrum, Oct. 1996, pp. 26–35.

Hanan Samet, "The Quadtree and Related Hierarchical Data Structures", ACM Computing Surveys, vol. 16, No. 2, Jun. 1984, pp. 187–260.

Eric J. Stollnitz et al., "Wavelets for Computer Graphics: A Primer, Part 1", IEEE Computer Graphics and Applications, May 1995, pp. 76–84.

Eric J. Stollnitz et al., "Wavelets for Computer Graphics: A Primer, Part 2", IEEE Computer Graphics and Applications, Jul. 1995, pp. 75–85.

* cited by examiner

Primary Examiner—Howard Britton
(74) Attorney, Agent, or Firm—Fitzpatrick, Cella, Harper & Scinto

(57) ABSTRACT

A method of compressing digital data is disclosed including the steps of transforming the data utilizing a discrete wavelet transform to produce corresponding transformed data; quantizing the transformed data utilizing a variable quantization determined by a corresponding quadtree structure wherein each of the quadtree leaf nodes has an associated quantization factor utilized in the quantizing of the transformed data. Preferably, the quadtree is determined to be an optimum in a rate distortion sense and encoded utilizing a binary prefix notation followed by a list of quantization factors. The method of Lagrange multipliers can be utilized to determine the optimum to a predetermined number of bits per data item. The present invention has particular application to image data or to video data and in particular frame difference data.

36 Claims, 15 Drawing Sheets

METHOD AND APPARATUS FOR DIGITAL DATA COMPRESSION

FIELD OF INVENTION

The present invention relates to the field of computer data compression with particular application to digital image compression. The present invention further provides for a spatially adaptive quantisation using quadtrees of discrete wavelet transform image and video data.

BACKGROUND OF INVENTION

The field of digital data compression and in particular digital image compression and digital video compression has attracted great interest for some time.

In the field of digital image compression, many different techniques have been utilised. In particular, one popular technique is the JPEG standard which utilises the discrete cosine transform to transform standard size blocks of an image into corresponding cosine components. In this respect, the higher frequency cosine components are heavily quantised so as to assist in obtaining substantial compression factors. The heavy quantisation is an example of a "lossy" technique of image compression. The JPEG standard also provides for the subsequent lossless compression of the transformed coefficients.

Recently, the field of wavelet transforms has gained great attention as an alternative form of data compression. The wavelet transform has been found to be highly suitable in representing data having discontinuities such as sharp edges. Such discontinuities are often present in image data or the like.

Although the preferred embodiments of the present invention will be described with reference to the compression of image data, it will be readily evident that the preferred embodiment is not limited thereto. For examples of the many different applications of Wavelet analysis to signals, reference is made to a survey article entitled "Wavelet Analysis" by Bruce et. al. appearing in IEEE Spectrum, October 1996 page 26–35. For a discussion of the different applications of wavelets in computer graphics, reference is made to "Wavelets for Computer Graphics", I. Stollinitz et. al. published 1996 by Morgan Kaufmann Publishers, Inc.

Further, digital compression techniques applied to video streams are also well known. For example, compression techniques relying on the video frame difference signals are also well known.

For objective and subjective reasons, better compression of digital signals can be obtained by varying the amount of quantisation of each region as compared to using a fixed amount of quantisation across a whole signal. Of course, usually some coding overhead will be required to indicate how the quantisation has been varied across the signal.

In the past, adaptive quantisation has been employed, for example, in the video compression standard MPEG and its various implementations.

It would be desirable to provide for a more adaptive form of quantisation of a signal rather than the fixed techniques presently known.

ASPECTS OF INVENTION

It is an object of the present invention to ameliorate one or more disadvantages of the prior art.

In accordance with a first aspect of the present invention, there is provided a method of compressing digital data including the steps of (a) transforming the data utilising a discrete wavelet transform to produce corresponding transformed data; (b) quantising the transformed data utilising a variable quantisation determined by a corresponding quadtree structure wherein each of the quadtree leaf nodes has an associated quantisation factor utilised in the quantising of the transformed data.

In accordance with a second aspect of the present invention there is provided a method of decompressing digital data, which digital data includes encoded quantized coefficients and associated quantization and quadtree information, the method including the steps of: (a) decoding said quantization and quadtree information; (b) decoding said encoded quantized coefficents; (c) inverse quantizing the decoded quantized coefficients in accordance with the quantization and quadtree information, wherein each quadtree leaf node has an associated quantization factor utilised in said inverse quantising of said decoded quantized coefficients; and (d) inverse transforming the inverse quantized coefficients.

In accordance with a third aspect of the present invention there is provided an apparatus for compressing digital data including the apparatus including: transformation means for transforming said data utilising a discrete wavelet transform to produce corresponding transformed data; quantization means for quantizing said transformed data utilising a variable quantisation determined by a corresponding quadtree structure wherein each of said quadtree leaf nodes has an associated quantisation factor utilised in said quantising of said transformed data.

In accordance with a fourth aspect of the present invention there is provided an apparatus for decompressing digital data, which digital data includes encoded quantized coefficients and associated quantization and quadtree information, the apparatus including; means for decoding said quantization and quadtree information; means for decoding said encoded quantized coefficents; means for inverse quantizing the decoded quantized coefficients in accordance with the quantization and quadtree information, wherein each quadtree leaf node has an associated quantization factor utilised in said inverse quantising of said decoded quantized coefficients; and means for inverse transforming the inverse quantized coefficients.

In accordance with a fifth aspect of the present invention there is provided a computer program product including a computer readable medium having recorded thereon a computer program for compressing digital data, the computer program product including: transformation means for transforming said data utilising a discrete wavelet transform to produce corresponding transformed data; quantization means for quantizing said transformed data utilising a variable quantisation determined by a corresponding quadtree structure wherein each of said quadtree leaf nodes has an associated quantisation factor utilised in said quantising of said transformed data.

In accordance with a sixth aspect of the present invention there is provided a computer program product including a computer readable medium having recorded thereon a computer program for decompressing digital data, which digital data includes encoded quantized coefficients and associated quantization and quadtree information, the computer program product including: means for decoding said quantization and quadtree information; means for decoding said encoded quantized coefficents; means for inverse quantizing the decoded quantized coefficients in accordance with the quantization and quadtree information, wherein each quadtree leaf node has an associated quantization factor utilised in said inverse quantising of said decoded quantized coefficients; and means for inverse transforming the inverse quantized coefficients.

BRIEF DESCRIPTION OF THE DRAWINGS

Embodiments of the invention are described, by way of example only, with reference to the drawings, in which.

DETAILED DESCRIPTION

Figure 1:
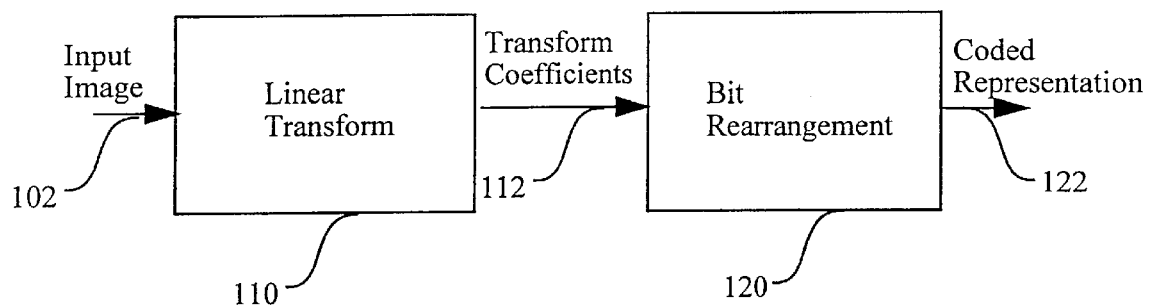
FIG. 1 is a high-level block diagram illustrating the image representation technique described in the herein-mentioned patent application.

Where reference is made in any one or more of the accompanying drawings to steps and/or features, which have the same reference numerals, those steps and/or features have for the purposes of this description the same function (s) and/or operation(s), unless the contrary intention appears.

Before proceeding with a description of the preferred embodiments, a description is given of the image compression and decompression method disclosed in Australian Provisional Patent Application No. PO 4728, entitled "A method for Digital Image Compression", filed on Jan. 22, 1997 by Canon Information Systems Research Australia Pty. Ltd. This method of compression and decompression is described in the following sections hereinafter entitled "1.0 Overview of SWEET Image Compression Method", "1.1 Encoding Process of First SWEET Image Compression Method", "1.2 Decoding Process of First SWEET Image Compression Method", "1.3 Two-Dimensional Example", and "1.4 Encoding Process of Second SWEET Image Compression Method"0.

1.0 Overview of SWEET Image Compression Method(s)

A high-level block diagram is illustrated in FIG. 1 to provide an overview of encoding method. An input image 102 is provided to the transform block 110, which is preferably a linear transform, to produce corresponding transform coefficients 112. A discrete wavelet transform (DWT) is preferably employed.

The two-dimensional DWT of an image is a transform that represents the image using a low frequency approximation to the image and three high frequency detail components. Conventionally, these components are termed subbands. Each of the four sub-images formed by the DWT is one quarter of the size of the original image. The low frequency image contains most of the information about the original image. This information, or energy compaction, is the feature of the discrete wavelet transform image subbands that is exploited for image compression.

The single-level DWT can be applied recursively to the low frequency image, or subband, an arbitrary number of times. For example, a three-level DWT of the image is obtained by applying the transform once and then applying the DWT to the low subband resulting from the transformation. Thus, this results in 9 detail subbands and one (very) low frequency subband. Even after three levels of DWTs, the resulting low frequency subband still contains a significant amount of information of the original image, yet is 64 times smaller ($\frac{1}{4} \times \frac{1}{4} \times \frac{1}{4}$), thereby effecting a factor of 64 in compression.

However, other linear transformations for decorrelating image data may be practiced. For example, a discrete cosine transform (DCT) can be practiced. The transform coefficients 112, or more specifically the bit sequences representing their values, are then coded by the bit rearrangement block 120 in an efficient fashion to provide the coded representation 122.

The decoding process is simply the reverse of this encoding process. The encoded coefficients are decoded into the transform coefficients. The (transform domain) image is then inverse transformed to form the original image, or some approximation thereof.

Before proceeding with a further description of the embodiments, a brief review of terminology used hereinafter is provided. For a binary integer representation of a number, "bit n" or "bit number n" refers to the binary digit n places to the left of the least significant bit. For example, assuming an 8-bit binary representation, the decimal number 9 is represented as 0000100. In this number, bit 3 is equal to 1, while bits 2, 1, and 0 are equal to 0, 0, and 1, respectively. Furthermore, a transform may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three-dimensional space, which passes through each bit sequence at the same bitnumber, is called a bitplane or bit plane.

For transform coding applications, the number of bits per coefficient required to represent the possible range of coefficients is determined by the linear transform and the resolution of each pixel (in bits per pixel) in the input image. This range of values for each pixel is typically large relative to the values of most of the transform coefficients, and thus many coefficients have a large number of leading zeros. For example, the number 9 has four leading zeros in a 8-bit representation and has 12 leading zeros for a 16-bit representation. The compression method and apparatus represents (or codes) these leading zeros, for blocks of coefficients, in an efficient manner. The remaining bits and sign of the number are encoded directly without modification.

To simplify and the description, the transform coefficients are assumed hereinafter to be represented in an unsigned binary integer form, with a single sign bit. That is, the decimal numbers −9 and 9 are represented with the same bit sequence, namely 1001, with the former having a sign bit equal to 1 to indicate a negative value, and the latter having a sign bit equal to 0 to indicate a positive value. The number of leading zeros is determined by the range of the transform coefficients. In using an integer representation, the coefficients are implicitly already quantised to the nearest integer value, although this is not necessary. Further, for the purpose of compression, any information contained in fractional bits is normally ignored.

A region includes a set of contiguous image coefficients. The term coefficient is used hereinafter interchangeably with pixel, however, as will be well understood by a person skilled in the art, the former is typically used to refer to pixels in a transform domain (eg., a DWT domain).

1.1 Encoding Process of First SWEET Image Compression Method

Figure 3:
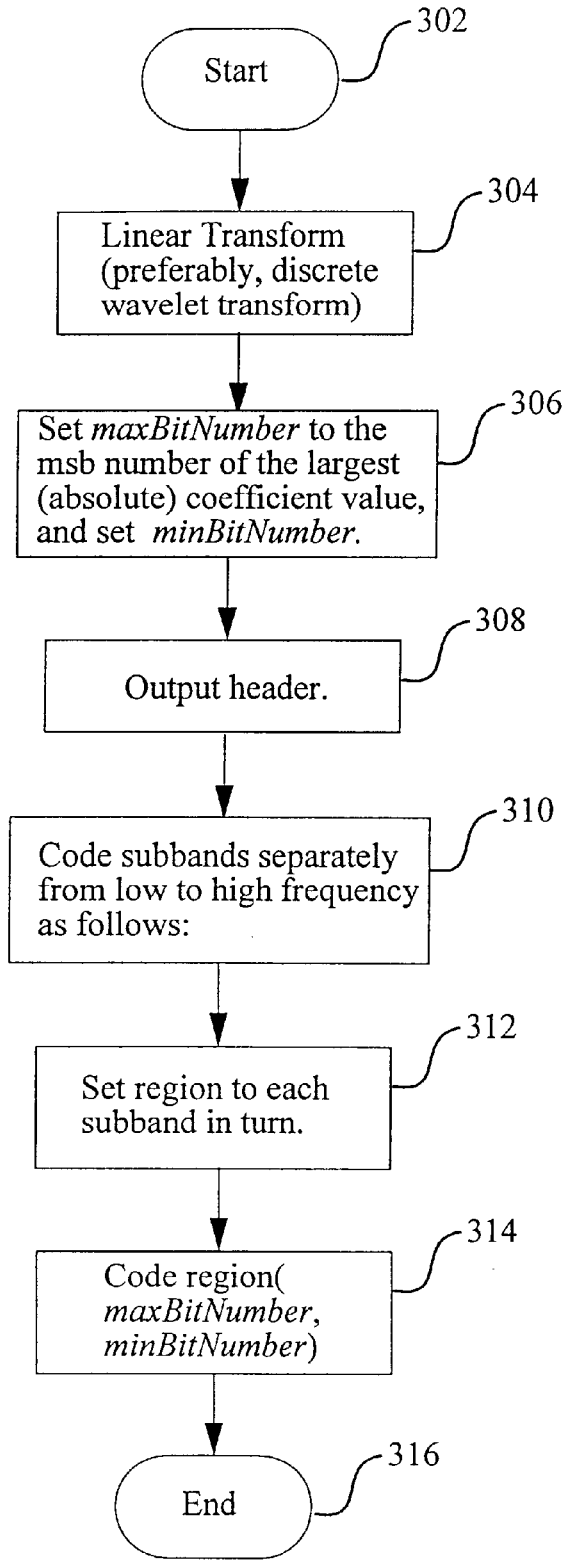
FIG. 3 is a flow diagram illustrating the method of representing, or encoding, an image described in the herein-mentioned patent application.
Figure 4:
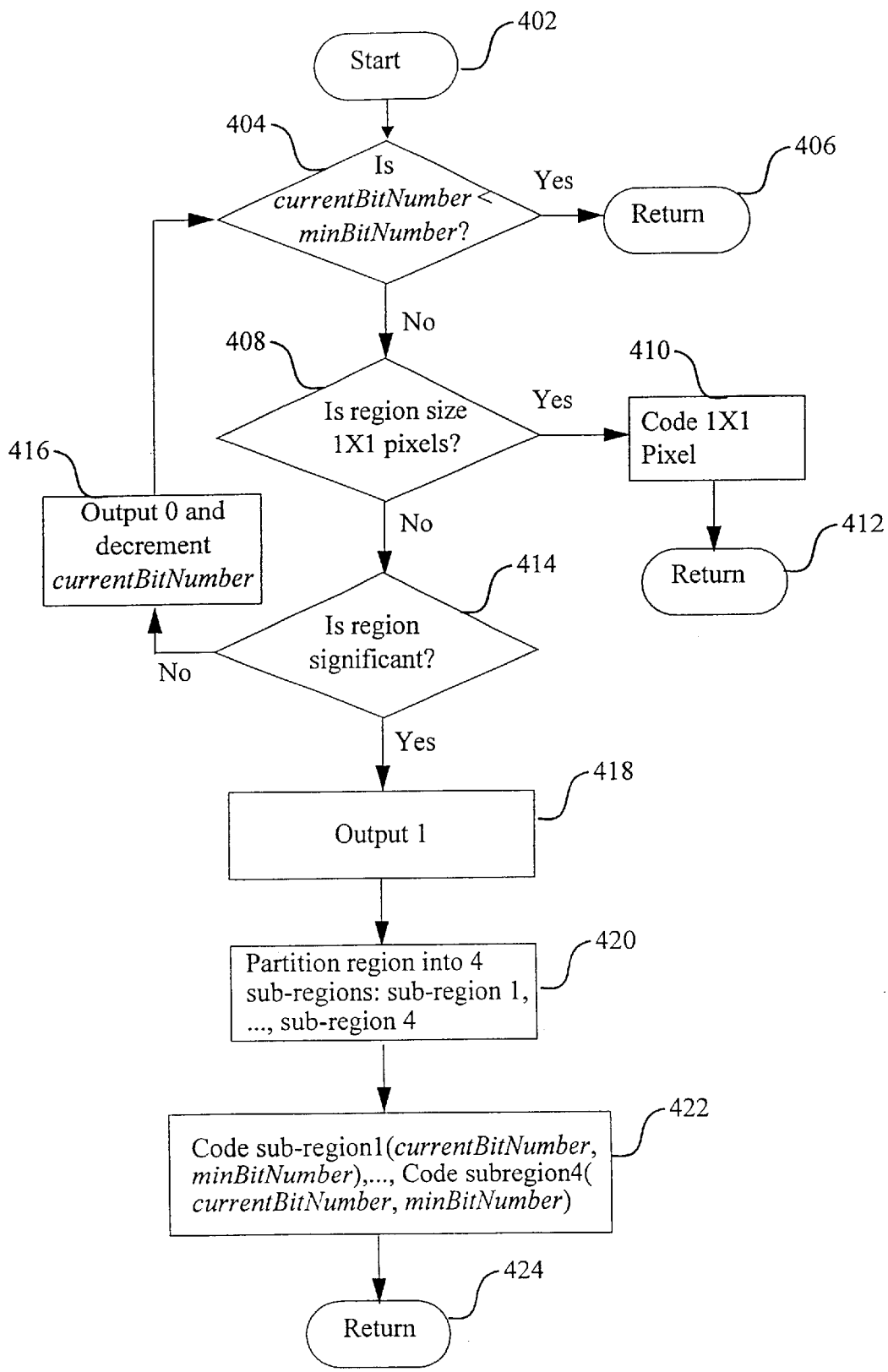
FIG. 4 is a detailed flow diagram illustrating the step of coding a region in FIG. 3.

A more detailed description of the first image compression method is provided with reference to FIGS. 3 and 4.

FIG. 3 is a flow diagram illustrating the first image encoding method. In step 302, processing commences using an input image. In step 304, the input image is transformed using a linear transformation, preferably a discrete wavelet transform. An initial region is defined to be the whole image. For example, in the case of a three-level DWT of the input image, the resulting coefficients consisting of the 10 subbands can be specified as the region. Alternatively each subband can be processed separately, setting each initial region to the whole subband in question.

In step 306, the most significant bit (msb) of the largest absolute value of the transform coefficients is determined and a parameter, maxBitNumber, is set to this coefficient value. For example, if the largest transform coefficient has a binary value of 00001001 (decimal 9), the parameter max-BitNumber is set to 3, since the msb is bit number 3. Alternatively, the parameter maxBitNumber may be set to be any value that is larger that the msb of the largest absolute value of the transform coefficients.

Further, in step 306, a coding parameter, minBitNumber is set to specify the coded image quality. In particular, this coding parameter specifies the precision of every coefficient in the transformed image and can be varied as required. For example, a minBitNumber of 3 provides a coarser reproduction of the original image than does a value of 1.

Optionally, the technique involves step 308, which provides an output header in the coded representation of the input image. Thus, in a practical implementation, header information is output as part of the coded representation. For example, the output header may contain information about the source image, including the image height and width, the number of levels of the DWT, the mean value of the DC subband, the maxBitNumber parameter, and the minBit-Number parameter.

Beginning in step 310, each subband of the transformed image is coded separately in steps 312 and 314. Each subband is coded independently, in order from low frequency to high frequency. For the DC subband, the mean value is removed prior to coding and coded into the header information in step 308. In step 312, each subband is coded by setting an initial region as the whole subband. In step 314, the region is encoded with the maxBitNumber and minBit-Number as parameters. This provides a hierarchical code, since lower resolution versions of the image are coded into the bit stream before higher resolutions. Processing terminates in step 316.

FIG. 4 is a detailed flow diagram of the procedure "Code region(currentBitNumber, minBitNumber)" called in step 314 of FIG. 3 for coding each region, where maxBitNumber is provided as the currentBitNumber. In step 402, processing commences. The inputs to the region coding process of FIG. 4 include the currentBitNumber and minBitNumber parameters. Preferably, the method is implemented as a recursive technique where the process is able to call itself with a selected region or sub-region. However, the process may implemented in a non-recursive manner.

In decision block 404, a check is made to determine if the currentBitNumber parameter is less than the minBitNumber parameter. Otherwise, if decision block 404 returns true (yes), nothing is done and processing returns to the calling procedure in step 406. This condition indicates that every coefficient in the selected region has a msb number less than minBitNumber. If decision block 404 returns false (no), processing continues at decision block 408.

In decision block 408, a check is made to determine if the selected region is a 1×1 pixel. If decision block 408 returns true (yes), processing continues at step 410. In step 410, the 1×1 pixel is coded. Preferably, this involves directly outputting the remaining bits above the minBitNumber in the coded representation. In step 412, processing returns to the calling procedure. Otherwise, if decision block 408 returns false (no), the region consists of more than one coefficient and processing continues at decision block 414.

In decision block 414, the selected region is checked to determine if it is significant. That is, the significance of the region is tested. The region is said to be insignificant if the msb number of each coefficient in the region is less than the value of the currentBitNumber parameter. To make the concept of region significance precise, a mathematical definition is given in Equation (1). At a given bit number, say currentBitNumber=n, the region is said to be insignificant if:

$$|c_{ij}|<2^n, \forall i,j \in R, \qquad (1)$$

where R denotes the region, and $c_{ij}$ denotes coefficient (i,j) in this region.

If decision block 414 returns false (no), processing continues at step 416. In step 416, a value of 0 (or first token) is output in the coded representation stream, and the currentBitNumber parameter is decremented by 1. That is, the next, lower bitplane of the region is selected for processing. Processing then continues at decision block 404, where the region is again processed with the parameters currentBitNumber−1 and minBitNumber. Otherwise, if decision block 414 returns true (yes), that is, the region is significant, processing continues at step 418.

In step 418, a value of 1 (or second token) is output in the coded representation stream. In step 420, the selected region is partitioned into a predetermined number (preferably, 4) of subregions using a specified partitioning algorithm. The partitioning algorithm used is known to the decoder.

Figure 2:
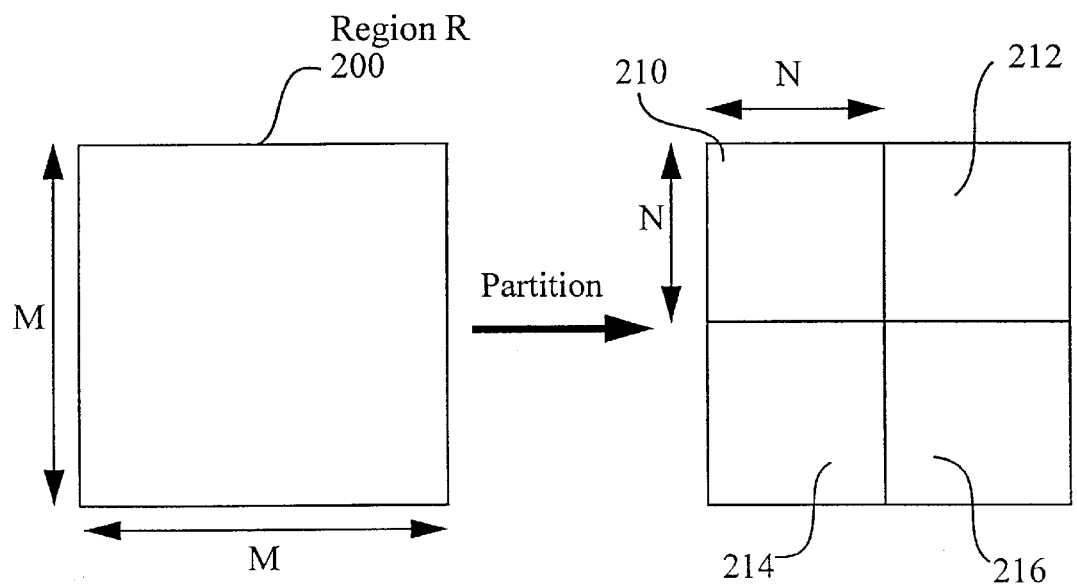
FIG. 2 is a diagram illustrating partitioning described in the herein-mentioned patent application.

In this method, square regions are used. A region is partitioned preferably into 4 equal-sized (square) subregions. As shown in FIG. 2, the selected region (R) 200 has a size of M×M coefficients and is partitioned into four equal-sized subregions 210, 212, 214 and 216. Each of the subregions has a size of N×N, where N is equal to M/2. This is not always possible depending on the size and shape of the initial region. If this is not possible, the initial region can be partitioned into a number of square regions, each having dimensions that are a power of 2, and encode these partitions separately. In any case, this initialization has minimal effect on the overall results if done in an intelligent fashion. Alternatively, a different partition may be used that is suitable for a block-based coder.

In step 422, each subregion is then coded with the same currentBitNumber and minBitNumber parameters. This is preferably done by means of a recursive call to the procedure "Code region(currentBitNumber, minBitNumber)" of FIG. 4. This coding of subregions may be implemented in parallel or sequentially. In the latter case, the processing may commence from a low frequency subband to higher frequency subbands in turn.

In the coded representation, a transform coefficient is coded by simply outputting the pixel bits from the currentBitNumber to the minBitNumber. Preferably, a convention is followed whereby the sign is output only if some of the coefficient bits were non-zero. For example, if currentBitNumber=3, minBitNumber=1, then −9 (00001001) is coded as "1 0 0" followed by a sign bit "1".

1.2 Decoding Process of First SWEET Image Compression Method

Figure 5:
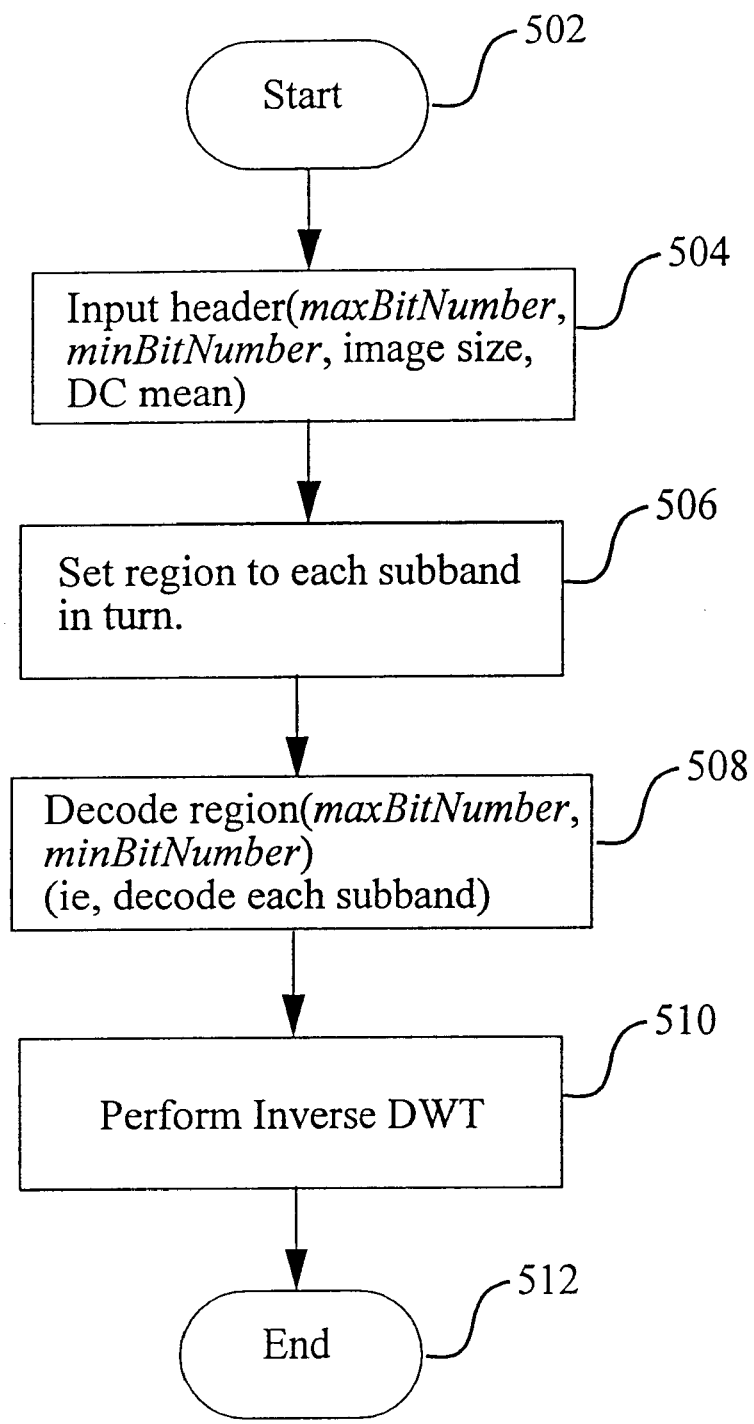
FIG. 5 is a flow diagram illustrating the method of decoding a coded representation of an image produced in accordance with the method FIG. 3.

FIG. 5 is a flow diagram illustrating a method of decoding the coded representation of an image obtained using the process of FIGS. 3 and 4. In step 502, processing commences using the coded representation. In step 504, the header information is read from the coded representation to determine the size of the original image, and hence the initial region size. Also, information such as maxBitNumber (equal to the initial currentBitNumber in the coding process) and minBitNumber are input. Further information includes the mean value of the DC subband.

In step 506, decoding of each subband is commenced by setting the region to the respective subbands in turn. In step 508, the selected region is decoded using the maxBitNumber and minBitNumber parameters. In step 510, the inverse DWT is applied to the decoded selected region. Processing terminates in step 512.

Figure 6:
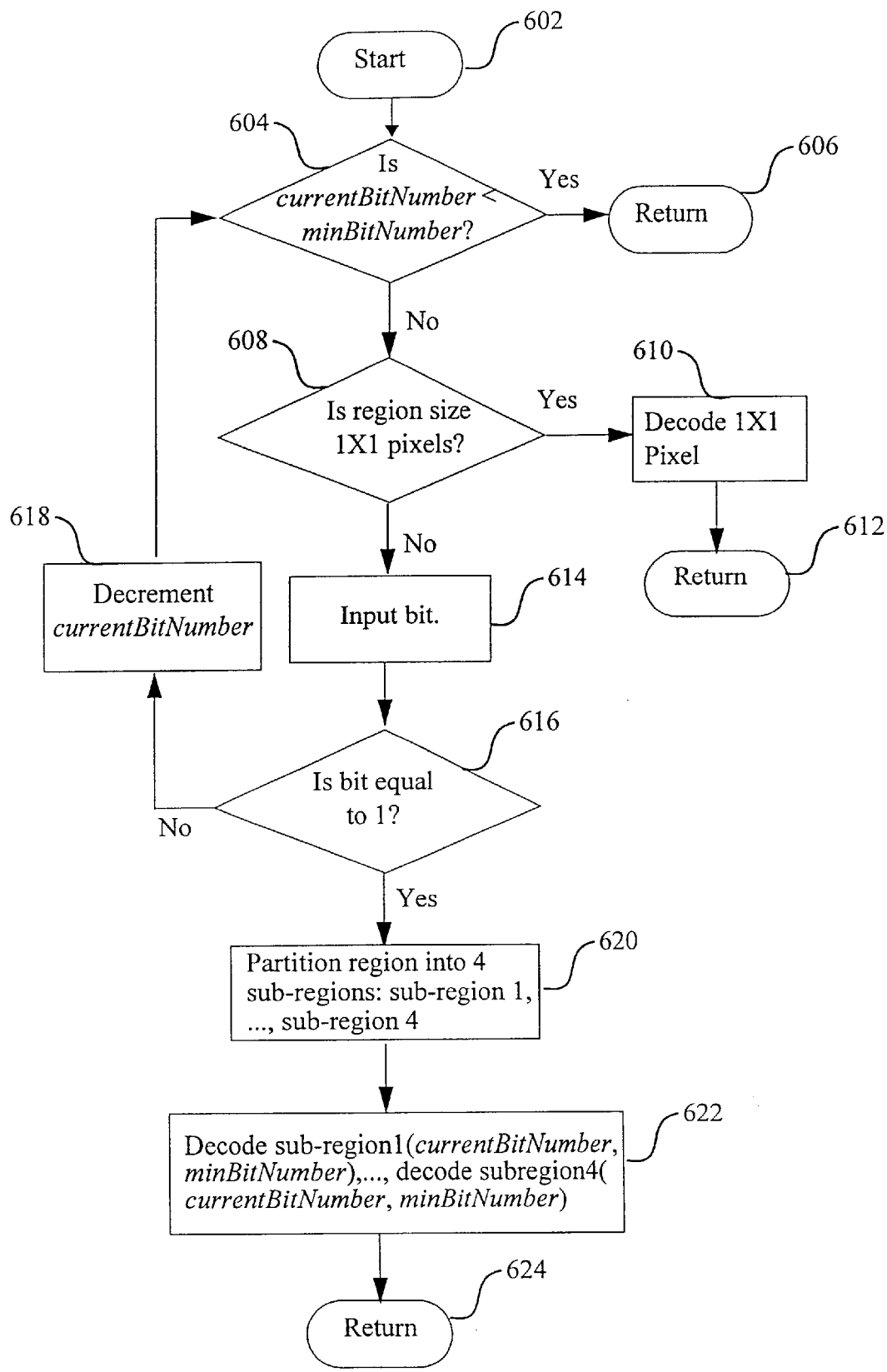
FIG. 6 is a detailed flow diagram illustrating the step of decoding a region in FIG. 5.

FIG. 6 is a detailed flow diagram of step 508 of FIG. 5 for decoding each region using procedure call "Decode region (currentBitNumber, minBitNumber)", where maxBitNumber is provided as the currentBitNumber. In step 602, processingcommences. The inputs to the region decoding process of FIG. 6 are the currentBitNumber and minBitNumber parameters. Again, the method is preferably implemented as a recursive technique. However, the process can be implemented in a non-recursive manner.

In decision block 604, a check is made to determine if the currentBitNumber is less than the minBitNumber. If decision block 604 returns true (yes), processing continues at step 606, where processing returns to the calling procedure. Otherwise, if decision block 604 returns false (no), processing continues at decision block 608.

In decision block 608, a check is made to determine if the selected region has a size of 1×1 pixels. If decision block 608 returns true (yes), processing continues at step 610. In step 610, the 1×1 region is decoded. Processing then returns to the calling procedure in step 612. If decision block 608 returns false (no), processing continues at step 614. In step 614, a bit is input from the coded representation.

In decision block 616, a check is made to determine if the bit is equal to 1, that is, the input is checked to determine if the region is significant. If decision block 616 returns false (no), processing continues at step 618. In step 618, the currentBitNumber is decremented, and processing continues at decision block 604. Otherwise, if decision block 616 returns true (yes), processing continues at step 620. In step 620, the region is partitioned into the predetermined number (preferably, 4) of sub-regions. In step 622, each of the sub-regions is decoded using the currentBitNumber and minBitNumber. This is carried out by means of a recursive call to the process illustrated in FIG. 6. In step 624, processing returns to the calling procedure.

Thus, the bits output from the significance decisions in the encoder instruct the decoder on which path of the algorithm to take, thus mimicking the encoder. The pixels, and possible sign, are decoded by simply reading in the appropriate number of bits (currentBitNumber to minBitNumber and if some of these are non-zero the sign bit).

1.3 Two-Dimensional Example

The method effectively codes the leading zeros of most transform coefficients, while coding the bits from the most significant bit to the predetermined least significant bit, specified by the parameter minBitNumber, and the sign simply as is. Thus, the compression method advantageously represents the leading zeros. This method is very efficient in certain situations, namely for coding discrete wavelet transform image coefficients, which typically exhibit a large dynamic range. A few coefficients typically have very large values, while most have very small values.

Figures 7A, 7B, 7C, 7D:
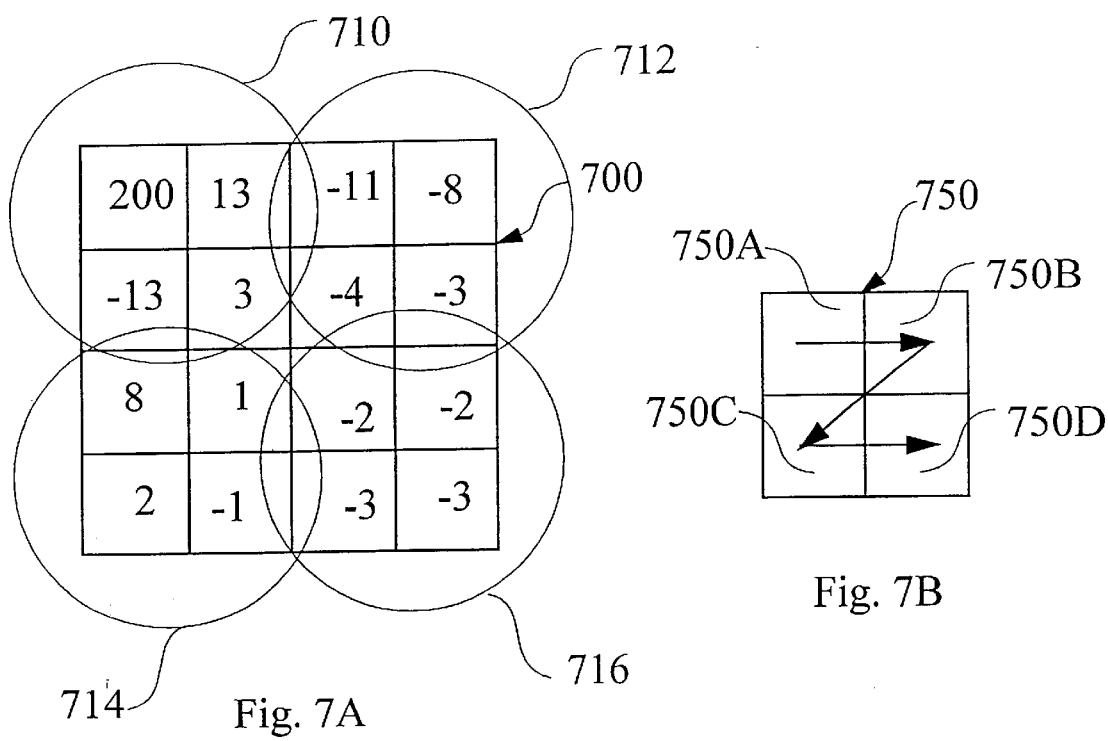
FIGS. 7A to 7D are diagrams illustrating the processing of a two-dimensional, eight-coefficient region in accordance with the encoding and decoding method of FIGS. 3 to 6.

An example of encoding a two-dimensional region including 4×4 coefficients is described with reference to FIGS. 7A to 7D. The processing of the 4×4 region 700 of FIG. 7A is commenced with the maxBitNumber set to 7 since this is the largest bit number (bitplane) of all of the coefficients:

$$\begin{bmatrix} 200 & 13 & -11 & -8 \\ -13 & 3 & -4 & -3 \\ 8 & 1 & -2 & -2 \\ 2 & -1 & -3 & -3 \end{bmatrix}.$$

The minBitNumber is set to 3, for illustrative purposes. A header is preferably output in the coded representation containing the maxBitNumber and minBitNumber. The process of coding the region 700 then follows.

At currentBitNumber=7, a one (1) is output since the region 700 is significant with respect to bit number 7 (see decision block 404, 408, and 414 and step 418 of FIG. 4). The region 700 is then partitioned into four sub-regions (see step 420 of FIG. 4): the top left region 710, the top right region 712, the bottom left region 714 and the bottom right region 716 of FIG. 7A. Each of the subregions consist of 2×2 coefficients.

The sub-regions 710, 712, 714 and 716 of FIG. 7A are in turn coded in the predefined processing sequence shown of FIG. 7B, where a region 750 consists of four sub-regions 750A to 750D. The three arrows illustrated in the diagram indicate the order or sequence of processing, that is, top left sub-region 750A, top right sub-region 750B, bottom left sub-region 750C, and bottom right sub-region 750D, respectively.

The sub-region 710 of FIG. 7A is coded first (see step 422 of FIG. 4). For the currentBitNumber equal to 7, a one (1) is output in the coded representation. The sub-region 710 is then partitioned into four 1×1 pixels having decimal values 200, 13, −13 and 3. Each of these coefficients is coded by outputting the bits of each coefficient from the currentBitNumber=7 to the minBitNumber=3 (see decision block 408 and step 410 of FIG. 4). A sign bit is then output if required. Thus, the decimal value is 200 is coded as 11001 followed by the sign bit 0. The coefficient value 13 is coded as 00001 with a sign bit 0. The coefficient value −13 is coded as 00001 with a sign bit 1. Finally, the coefficient value 3 is coded as 00000 (without a sign bit). The coded representation of each coefficient includes the two "1" bits preceding the bits of coefficients "200" between the currentBitNumber and minBitNumber. This completes the coding of the top left sub-region 710. The coded output at this state is:

$$\underset{200}{11\underline{1}\underline{1}\underline{0}\underline{0}\underline{1}} \overset{sign\ bit}{\underline{0}} \underset{13}{00001\underline{0}00001} \underset{-13}{100000}.$$

The header information is not shown in the foregoing expression.

The top right sub-region 712 is then coded (per FIG. 7B). A zero (0) is output for each of currentBitNumber equal to 7, 6, 5, and 4, since the region 712 is insignificant with respect to these bit numbers. A one (1) is output at currentBitNumber=3, since this bitplane is significant with respect to bit number 3.

The sub-region 712 is partitioned into the four 1×1 pixels having values −11, −8, −4 and −3. These decimal values are coded as bit value 1 with sign bit 1, bit value 1 with sign bit 1 and bit values 0 and 0 without sign bits, respectively. Thus, at this stage, the coded representation is as follows:

$$1111001000001000001100000000001 \underset{-11}{\underline{1}\underline{1}} \underset{-8}{\underline{1}\underline{1}} \underset{-4}{\underline{0}} \underset{-3}{\underline{0}}$$

The bottom left sub-region 714 is then encoded. A zero (0) is output for each of currentBitNumber equal to 7, 6, 5, and 4, since the region 714 is insignificant with respect to these bit numbers. A one (1) is output at currentBitNumber equal to 3, since this bitplane is significant with respect to bit number 3. The sub-region 714 is then partitioned into four 1×1 pixels having values 8, 1, 2 and −1. These are coded respectively as binary value 1 with sign bit 0, and binary values 0,0 and 0 without sign bits.

Finally, the bottom right sub-region 716 having values −2, −2, −3, and −3 is coded. A zero (0) is output for each of currentBitNumber=7, 6, 5, 4 and 3 since the sub-region 716 is insignificant with respect to these bit numbers. No sign bits are output. Thus, the coded representation is as follows:

$$1111001000001000001100000000011111000001100000000.$$

The decoder simply mimics the encoding process to reconstruct the region from the coded representation as depicted in FIG. 7C.

The decoding process can be made "smarter" in a number of ways. One such a "smarter" way is depicted in FIG. 7D. In this case, the magnitude of the non-zero coefficients is each increased by half of 2 to the power of minBitNumber. This is depicted in FIG. 7D. In this manner, the "smart" decoding processing generally reduces the mean square error between the decoded and the original coefficients. Still further, the encoder can alternatively perform this (type of) operation, thereby leaving the decoder to use the simplest depicted in FIG. 7C.

1.4 Encoding Process of Second SWEET Image Compression Method

A coding process according to an alternate method is hereinafter described with reference to FIGS. 9 to 12.

A discrete wavelet transform of an entire digital image can be performed on a block-by-block basis. The result of the transformation upon each block is a set of coefficients, which are essentially equivalent to a set of spatially corresponding coefficients of a discrete wavelet transform of the entire image. For example, from a predetermined set of coefficients of a DWT for an entire image, a portion or block of the digital image can be reproduced to a specified detail. Selecting the predetermined set of coefficients from the frequency domain amounts substantially to representing the corresponding portion of a digital image (the block) from the spatial domain. A block based DWT of a digital image can be performed by decomposing an image into a plurality of blocks and applying the transform to each block independently, thereby substantially evaluating those DWT coefficients relevant to the current spatial location. The advantage of adopting a block-based transform approach is that a block can be subsequently encoded with minimal interaction (substantially independent) from another lock of the image. Block-based techniques are inherently memory localized and therefore are generally efficient when implemented using computer systems.

Figure 9:
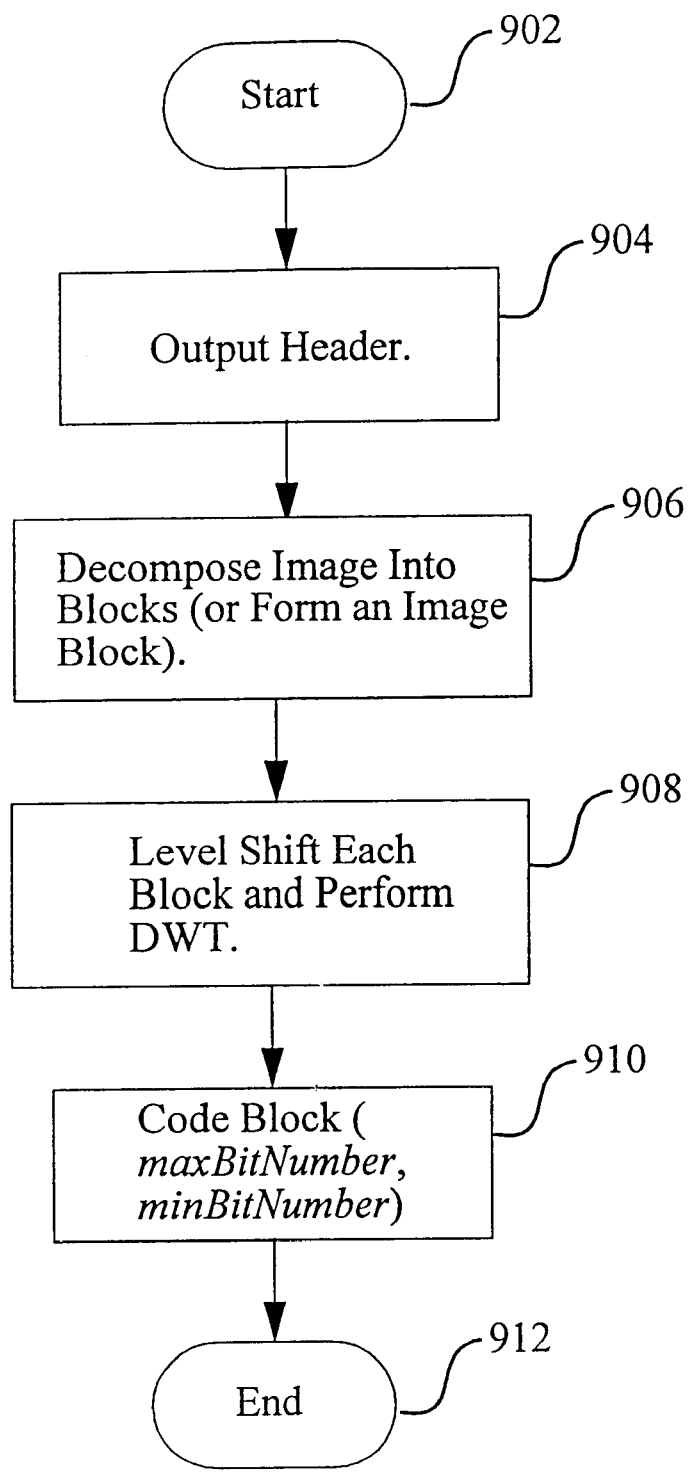
FIGS. 9 to 12 are flow diagrams illustrating an alternate method representing, or encoding, an image described in the herein-mentioned patent application.

FIG. 9 is a flow diagram illustrating the block-based encoding process according to the second encoding method. Processing commences at step 902. In step 904, a header is output. This information preferably includes the image height and width, the block size, the number of levels of the DWT, and two coding parameters maxBitNumber and minBitNumber. Optionally, more or less header information may be used depending upon the application.

The coding parameter maxBitNumber can be selected in a variety of ways. If the block DWT is performed on all image blocks prior to coding of any of them, the maxBitNumber can be chosen to be the MSB number of the largest coefficient across all DWT blocks. For example, if the largest coefficient is 10000001 (decimal value 129), the maxBitNumber is set to 7 since the MSB is bit number 7. Alternatively, a deterministic bound can be used which is determined by the transform and the resolution of the input image. For example, with an 8-bit input image (level shifted to 7-bits plus sign) and the Haar transform, the largest MSB is bounded by J+7 where J is the number of levels of the DWT. If the blocks are small, the selection of this parameter can have a significant effect on compression. In some instances, more sophisticated ways of selecting maxBitNumber may be employed. However, this depends upon the specific application.

The parameter minBitNumber determines the compression ratio versus quality trade off and can be varied. For example, for nearly orthogonal transforms, a value of 3 provides adequate image quality for 8-bit, grey-scale or 24-bit, RGB images.

In step 906, the image is decomposed into blocks (or an image block is formed). The image is decomposed preferably into overlapping blocks. However, non-overlapping blocks may be employed. The block of coefficients can be as large as the whole original image, or as small as a block of 8×8 coefficients (for a three-level transform). For low memory applications, a block that is as small as possible may be employed. Generally, a block size of 16 coefficients is sufficient for higher levels of compression with a three or four level DWT. A block size of 8×8 coefficients with a three-level DWT can maintain good coding efficiency by employing differential pulse code modulation (DPCM) on the DC coefficient of each block.

In step 908, each block is level shifted and the transform is performed. Preferably, a DWT is employed. The image values are level shifted (for example, by 128 for an 8-bit image) to reduce or eliminate any undue mean bias, and each spatial block of the image is transformed. For a DWT, usually some knowledge of the block surrounding the current block is needed (and similarly for the inverse DWT), although this is not strictly required.

In step 910, the block is coded using the maxBitNumber and minBitNumber parameters. Processing terminates in step 912.

Figure 10:
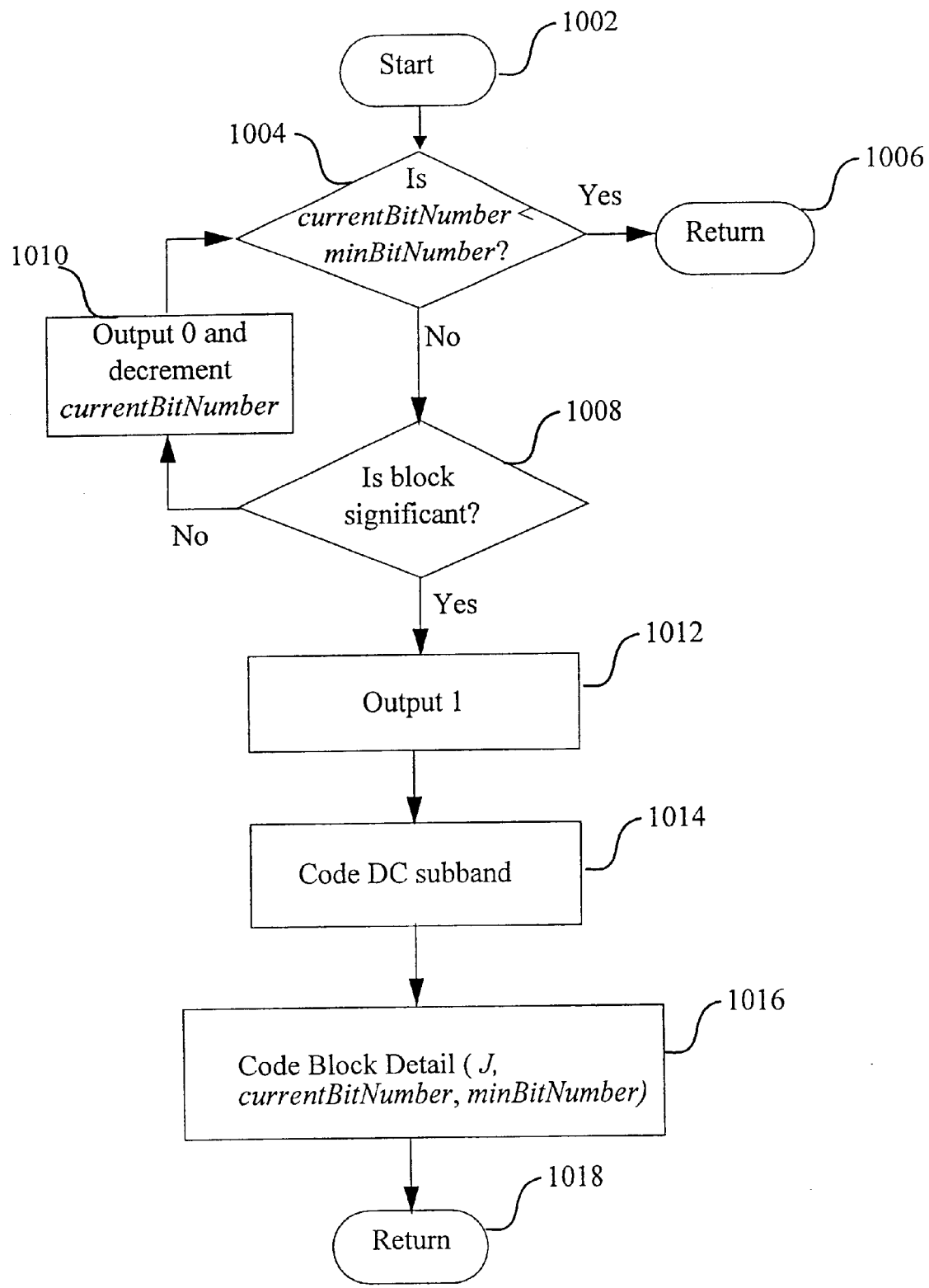

Step 910 for coding a block is illustrated in detail in the flow diagram of FIG. 10. The inputs to the block coding process of FIG. 10 include the currentBitNumber and the minBitNumber parameters. With reference to step 910 of FIG. 9, the maxBitNumber is input as the currentBitNumber parameter. Processing commences in step 1002. In decision block 1004, a check is made to determine if the currentBit-Number is less than the minBitNumber. If decision block 1004 returns true (yes), processing continues at step 1006. In step 1006, execution returns to the calling process, thereby indicating that every coefficient in the block has an MSB number less than the minBitNumber. Otherwise, if decision block 1004 returns false (no), processing continues at decision block 1008.

In decision block 1008, a check is made to determine if a current block is significant. If decision block 1008 returns false (no), processing continues at step 1010. In step 1010, a zero (0) is output in the coded representation and the currentBitNumber is decremented, that is, the next lower bit plane is selected. Processing then continues at decision block 1004. Otherwise, if decision block 1008 returns true (yes) processing continues at step 1012.

Decision blocks 1004 and 1008 along with step 1010 enable the process to find the MSB number of the largest coefficient in the block. A block is insignificant with respect to the currentBitNumber if the MSB number of every coefficient in the block is less than the currentBitNumber. This is repeated until the bitplane of the block is significant or the currentBitNumber is less than the minBitNumber.

In step 1012, a one (1) is output in the coded representation to indicate the bitplane is significant. In step 1014, the DC subband is coded. In step 1016, the block detail is coded using the parameters J, currentBitNumber and minBitNumber. In step 1018, execution returns to the calling procedure. Thus, given that the block is significant, steps 1012, 1014 and 1016 are carried out to use the (generalized) quadtree segmentation to find all coefficients with an MSB number greater than the minBitNumber. If the block is significant, it is partitioned into two "sub-blocks": the DC subband coefficients and the block consisting of the remaining coefficients, referred to as the "block detail" for level J since it represents the high frequency information about the block of level J at all lower levels.

Figure 12:
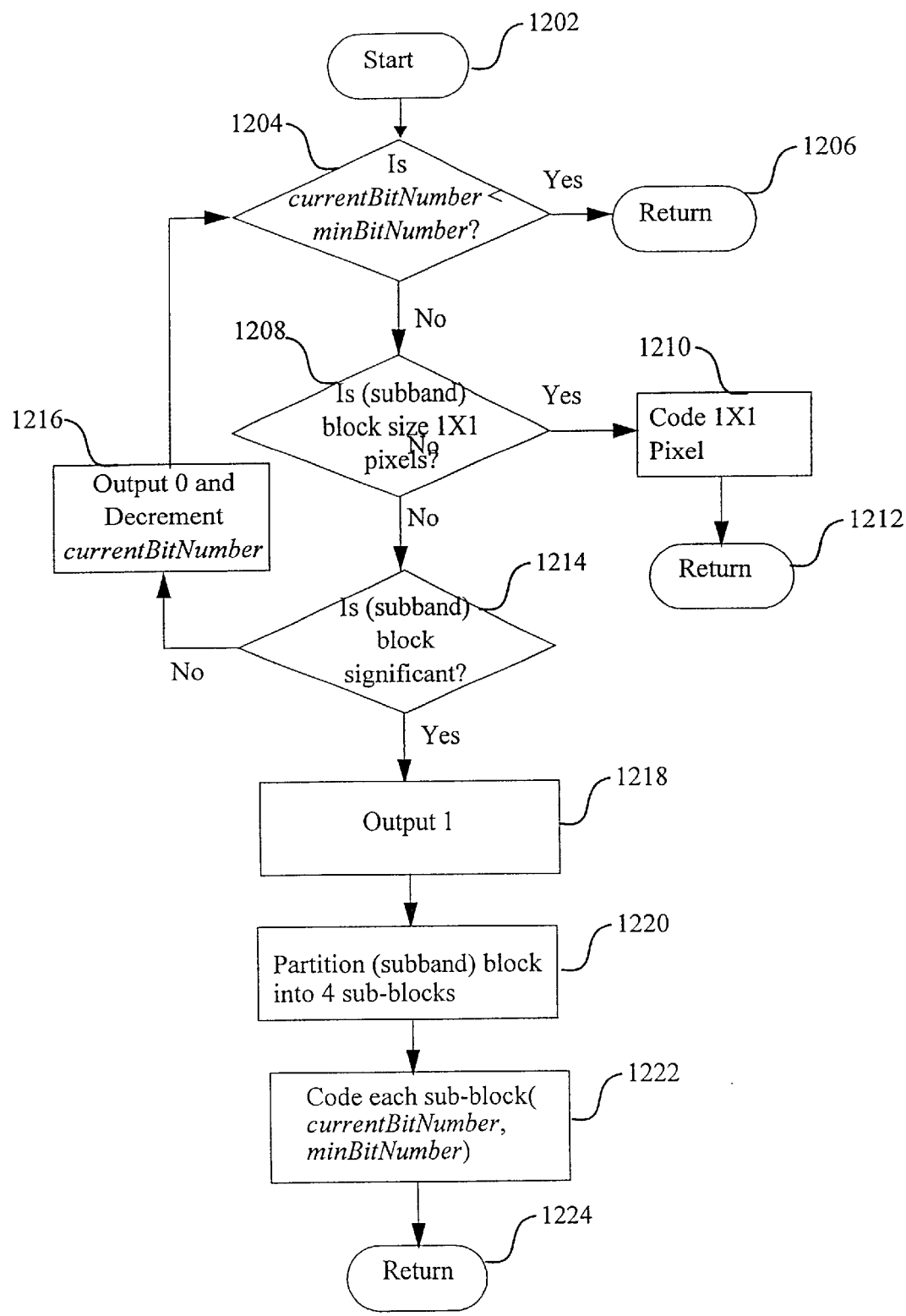

Step 1014 of FIG. 10 for coding the DC subband is illustrated in detail by the flow diagram of FIG. 12. That is, FIG. 12 shows the process of coding a subband or sub-block using currentBitNumber and minBitNumber parameters. In step 1202, processing commences. In decision block 1204, a check is made to determine if the currentBitNumber is less than the minBitNumber. If decision block 1204 returns true (yes), processing continues at step 1206. In step 1206, execution returns to the calling procedure. Otherwise, if decision block 1204 returns false (no), processing continues at decision block 1208.

In decision block 1208 a check is made to determine if the (subband) block size is 1×1 pixels. If decision block 1208 returns true (yes), processing continues at step 1210. In step 1210, the 1×1 pixel is coded. This involves outputting the bits between the currentBitNumber and the minBitNumber, inclusive, followed by a sign bit if necessary. Processing then returns to the calling procedure in step 1212. Otherwise, if decision block 1208 returns false (no), processing continues at decision block 1214.

In decision block 1214, a check is made to determine if the (subband) block is significant. If decision block 1214 returns false (no), processing continues at step 1216. In step 1216, a zero (0) is output in the coded representation and the currentBitNumber is decremented. Processing then continues at decision block 1204. Otherwise, if decision block 1214 returns true (yes), processing continues at step 1218.

In step 1218, a one (1) is output in the coded representation to indicate that the (subband) block is significant. In step 1220, the (subband) block is partitioned into four sub-blocks. In step 1222, each sub-block is coded using the parameters currentBitNumber and minBitNumber, by means of a recursive call to the process of FIG. 12. In step 1224, execution returns the calling procedure.

Thus, in the process of FIG. 12, a subband or sub-block thereof is coded. The largest MSB number is isolated as before. If the sub-block consists of only one pixel, it is coded as a single coefficient. Otherwise, the currentBitNumber is decremented and a zero (0) is output in the coded representation until the currentBitNumber is less than the minBitNumber, or the subband (sub-block) is significant. If the subband (sub-block) is significant, it is partitioned into four (as close to equal as possible) sub-block, and these are coded in turn. A single coefficient, for example the DC coefficient, is encoded by outputting the coefficient bits from the currentBitNumber to the minBitNumber. Again, the sign is preferably only output if some of the coefficient bits are non-zero.

Figure 11:
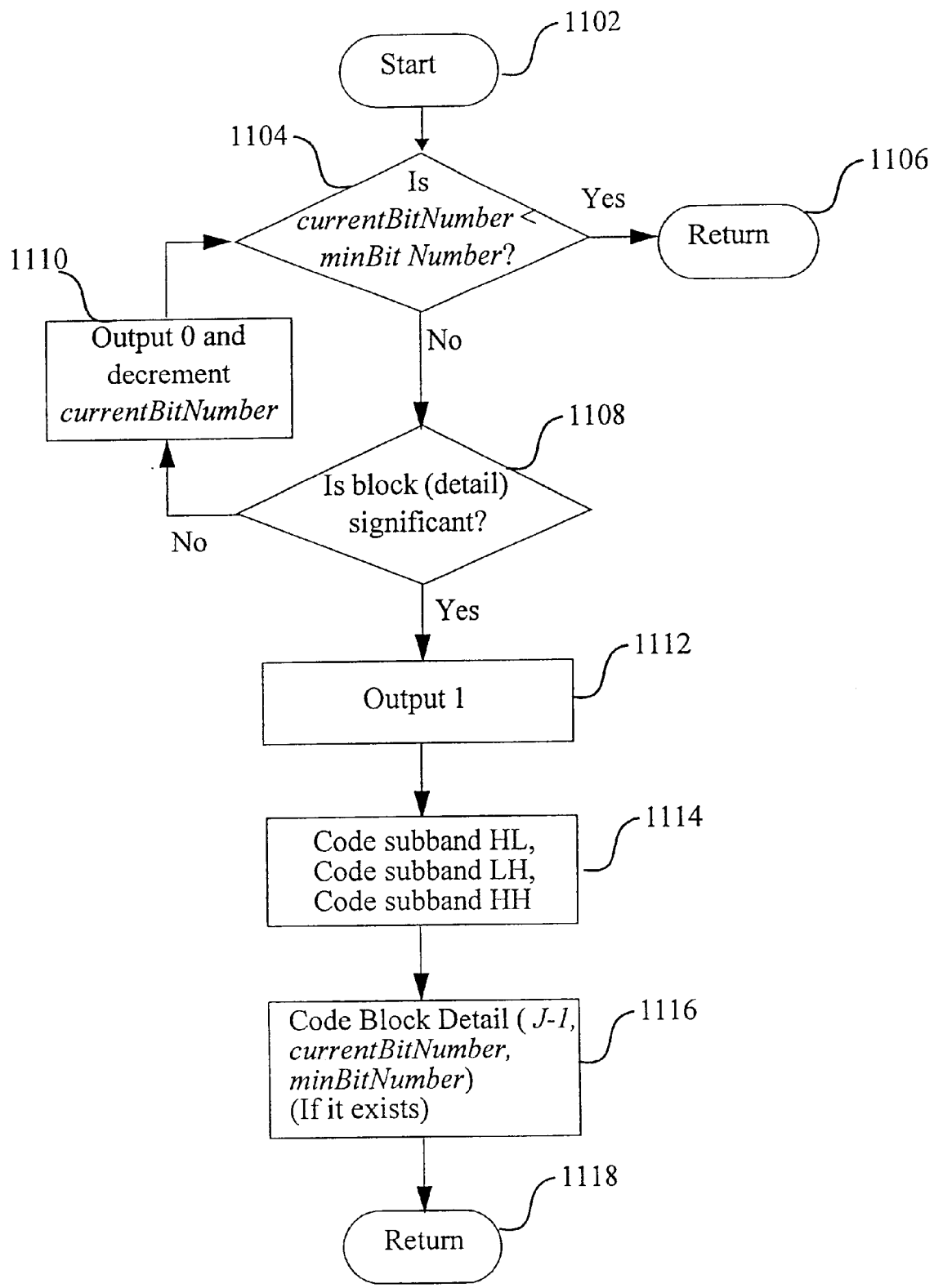

Step 1016 of FIG. 10 for coding block detail is illustrated by the flow diagram of FIG. 11. In step 1102, processing commences. In decision block 1104, a check is made to determine if the currentBitNumber is less than the minBit-Number. If decision block 1104 returns true (yes), execution returns to the calling procedure in step 1106. Otherwise, if decision block 1104 returns false (no), processing continues at decision block 1108.

In decision block 1108, a check is made to determine if the block (detail) is significant. If decision block 1108 returns false (no), processing continues at step 1110. In step 1110, a zero (0) is output in the coded representation and the currentBitNumber is decremented. Processing then continues at decision block 1104. Otherwise, if decision block 1108 returns true (yes), processing continues at step 1112.

In step 1112, a one (1) is output in the coded representation to indicate that the block (detail) is significant. In step 1114, each of the high-low (HL), low-high (LH), and high-high (HH) frequency subbands is coded. The HL, LH, and HH frequency subbands of each resolution are commonly referred to as AC subbands. Each of these subbands is coded in accordance with the process of FIG. 12. In step 1116, the block detail is coded using the parameters J−1, currentBit-Number and minBitNumber (if the block detail exists) by means of a recursive call to the process illustrated in FIG. 11. Execution returns to the calling procedure in step 1118.

Thus, the block detail for level J is processed to first isolate the MSB number of the largest coefficient. This is done by decrementing the currentBitNumber and outputting zeros until the block is significant. The block is then partitioned into the three high frequency subbands at level J and the block detail for level J−1 (if J−1 is greater than 0). This partitioning approach is motivated by the so-called 1/f type spectral models.

The decoding process for the second method can be implemented by mimicking the coding process described with reference to FIGS. 9 to 12.

The encoding and decoding methods and apparatuses represent digital image data in an efficient and flexible manner, in which the representation is suitable for storing and/or transmitting images. The encoding techniques can be used generally to represent an array of transform coefficients, and to provide an efficient representation by representing an image in the discrete wavelet transform domain. In particular, the methods and apparatuses represent (or code) leading zeros of blocks of transform coefficients obtained from an input image. The techniques are efficient in terms of offering a good reproduction of the original image for a given size code and offering fast decoding. Further, the techniques are flexible in that coefficients obtained from a linear transformation are encoded independently without the use of entropy coding. The advantageous aspects of the methods include the depth first nature of the coding. Further, in the case of coding subbands, the advantageous aspects of the method include hierarchical coding of each subband separately.

2. Preferred Embodiment(s) of Method

The preferred embodiment utilises the wavelet transform process and proceeds initially by means of a wavelet transform of image data. A description of the wavelet transform process is given in many standard texts and in particular the aforementioned book by Stollnitz et. al. An overview of the wavelet process will now be described with reference to the accompanying drawings.

Figure 13:
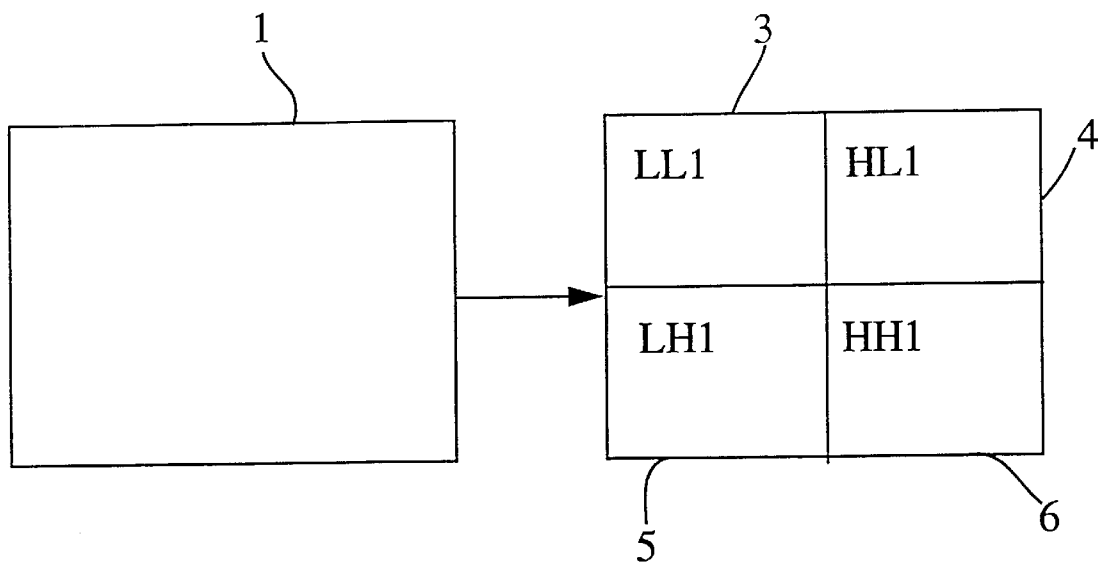
FIGS. 13–15 illustrate the process of wavelet transforming image data.

Referring initially to FIG. 13, an original image 1 is transformed utilising a Discrete Wavelet Transform (DWT) into four subimages 3–6. The subimages or subbands are normally denoted LL1, HL1, LH1 and HH1. The one suffix on the subband names indicates level 1. The LL1 subband is a low pass decimated version of the original image.

Figure 14:
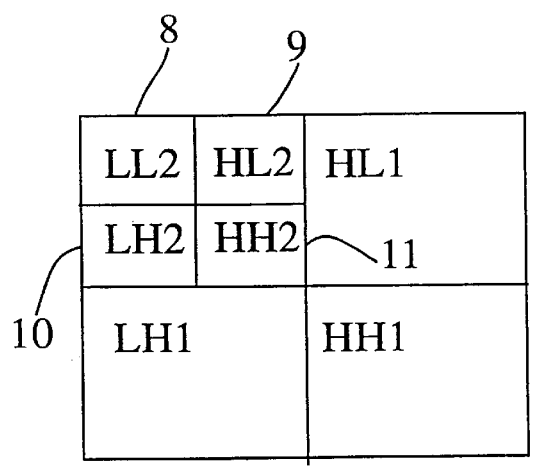
Figure 15:
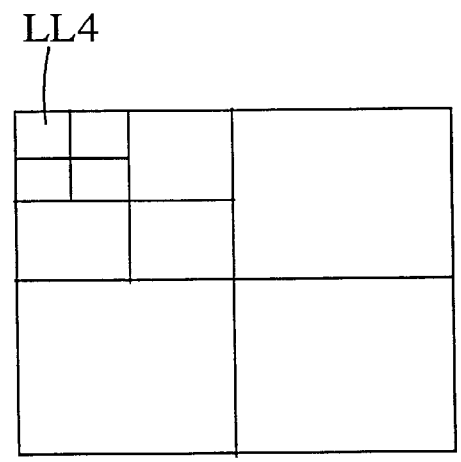

The wavelet transform utilised can vary and can include, for example, Haar basis functions, Daubechies basis functions etc. The LL1 subband is then in turn utilised and a second Discrete Wavelet Transform is applied as shown in FIG. 14 giving subbands LL2 (8), HL2 (9), LH2 (10), HH2 (11). This process is continued for example as illustrated in FIG. 15 wherein the LL4 subband is illustrated, the LL4 band decomposition process being referred to as an octave band filter bank with the LL4 subband being referred to as the DC subband. Obviously, further levels of decomposition can be provided depending on the size of the input image.

Each single level DWT can in turn be inverted to obtain the original image. Thus a J-level DWT can be inverted as a series of J-single level inverse DWT's.

An image coding hierarchically can proceed by coding the DC subband. Then, the remaining subbands are coded in order of decreasing level. That is for a 4 level DWT, the subbands at level 4 are coded after the DC subband (LLA). That is the HL4, LH4 and HH4 subbands. The subbands at level 3 (HL3, LH3, and HH3) are then coded, followed by those at level 2 (HL2, LH2 and HH2) and then level 1 (HL1, LH1 and HH1).

With standard images, the encoded subbands normally contain the "detail" information in an image. Hence, they often consist of a sparse array of values and substantial compression can be achieved by quantisation of the subbands and efficient encoding of their sparse matrix form.

Figure 16:
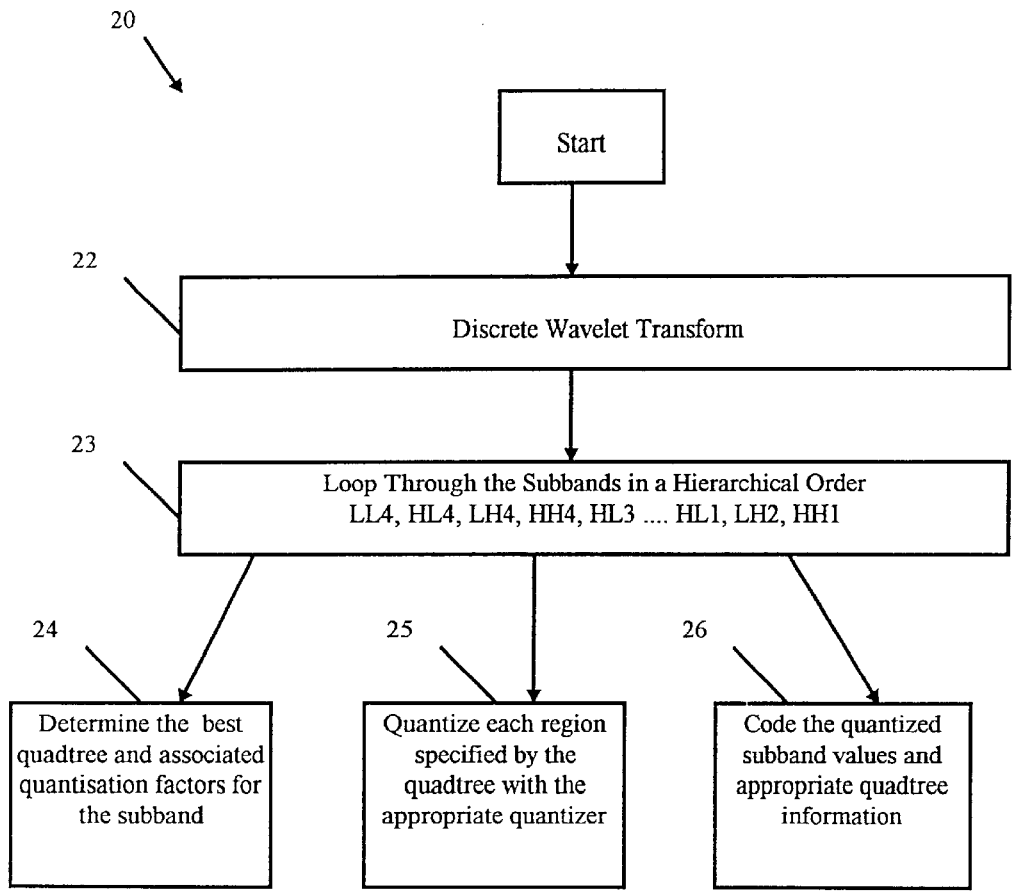
FIG. 16 illustrates a flow chart of the encoder operation.

An overview of the encoding process is as illustrated by the flow chart 20 of FIG. 16. The encoded process begins by applying a discrete wavelet transform 22 to the image data to produce the usual subbands. Next, the subbands are looped through in hierarchical order 23 from the lowest frequency subband to the highest. For each subband three steps 24–26 are performed wherein the step 24 includes determining the best quadtree and associated quantisation factors for the subband. Next, each region is quantised as specified by the quadtree with the appropriate quantiser 25. Next, the quantised subband values and the appropriate quadtree information is encoded 26.

Figure 17:
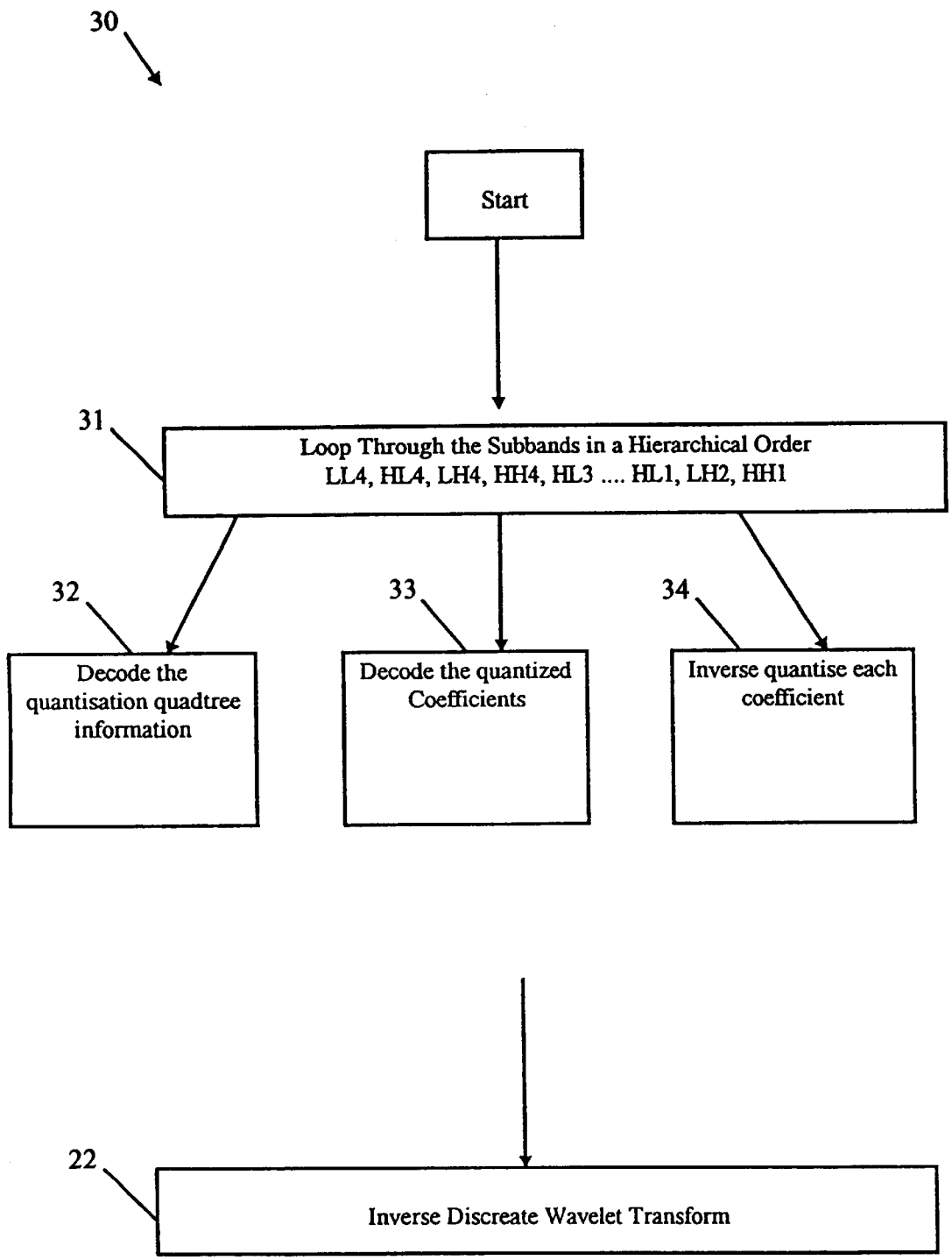
FIG. 17 illustrates the operation of the decoder.

Turning now to FIG. 17, there is illustrated the decoding process. Each of the subbands is treated in order with the subbands being looped through 31 and the inverse processes 32–34 are applied to the subbands. The first step 32 includes decoding the quantisation and quadtree information. Next, the quantised coefficients are decoded 32 before an inverse quantisation process is applied 34. The resultant data is then inverse discrete wavelet transformed 35 so as to produce the original data.

The core portion of the preferred embodiment is the process of determining the best quadtree and associated quantisation factors for the subband 24. Each subband is partitioned into variable sized regions using a quadtree structure and associated with each region, or leaf within the quadtree, is a quantisation factor. The utilisation of quadtrees can proceed along standard lines. For a full description of quadtrees and alternative data structures that may be suitable, reference is made to the standard survey article entitled "The Quadtree and Related Hierarchical Data Structures" by Hanan Samet, published in Computer Surveys, vol. 16, no. 2, June 1984 at pages 187–260. In the preferred embodiment, each region is uniformly quantised with a quantisation parameter represented as an index value. The index values for each subband are then encoded along with the quadtree structure and the quantisation data associated with each leaf of the quadtree.

Although many different encoding processes can be utilised, in the preferred embodiment, the coding of the quantisation data can be achieved utilising the SWEET methodology as disclosed in Australian provisional patent specification No. PO4728 and described herein and hereinafter called SWEET coding. As will become evident, the present invention differs from previous SWEET coding in that it utilizes dynamic quantisation.

Figure 18:
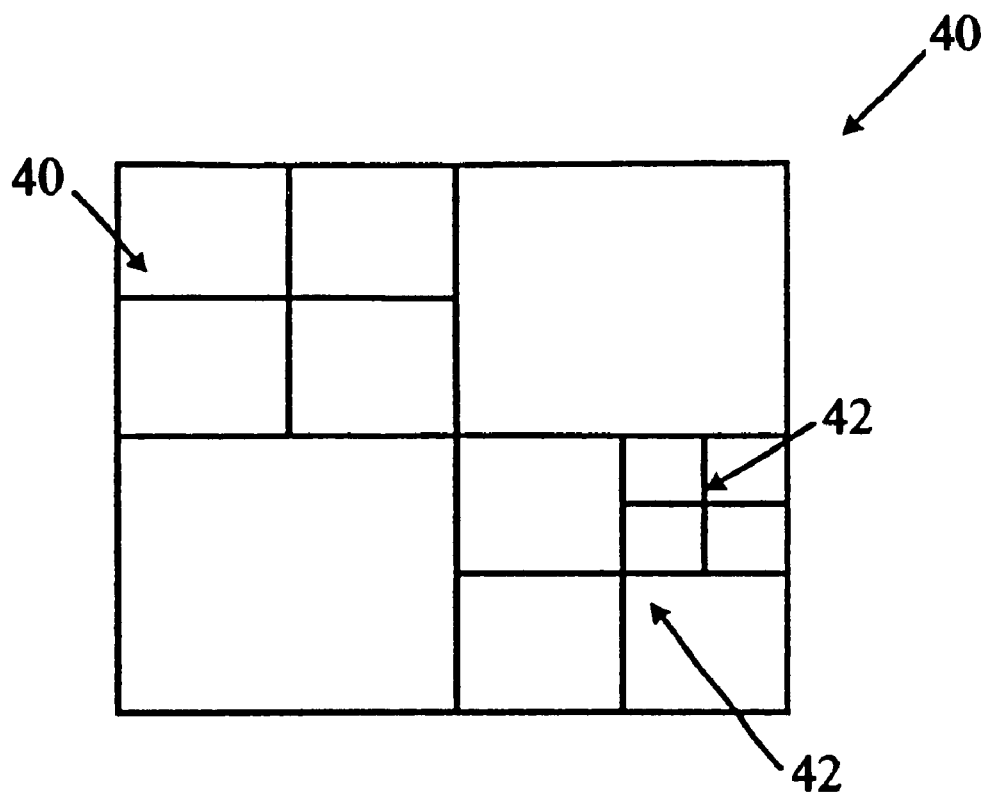
FIG. 18 illustrates one particular form of quadtree partition.

In order to be able to vary the quantisation spatially within a subband, a quadtree structure is utilised to divide up the image. The quadtree can be used to represent a certain partition of a region into several variable sized subregions. For example, given a rectangular region or array of coefficients, it is possible to partition the region into four subregions, in accordance with standard quadtree techniques. Within each region, it is possible to recursively partition or leave the region "as is" depending on a predetermined criterion. For example, FIG. 18 illustrates an example quadtree structure, the structure of which will be readily familiar to those familiar with quadtrees. In this respect, the region 40 has been partitioned into four subregions with only the regions 41 and 42 being "subpartitioned". With the bottom right region 42 being further sub-partitioned 43.

With each leaf node of the quadtree, a quantisation parameter is determined. A different quantisation factor can be provided for each subregion. The structure of the quadtree 40 and associated quantisation parameters are coded into the compressed image bit stream. The decoding process utilises this information to inverse quantise each subregion with an appropriate quantisation factor.

A quadtree can be represented as a sequence of binary partitioning decisions. A "1" can be used to represent a partition of a region, while a "0" can be used to represent a leaf node, or the fact that a region is not partitioned. Using a depth first approach to representation, immediately following a 1 bit describing a partition of a region are the binary partitioning decisions of the corresponding subregions. The subregion partitioning decisions can be encoded in the order of top left, top right, bottom left and bottom right. Thus the quadtree 40 of FIG. 18 can be represented by the binary sequence 11000000101000000. The first "1" represents a partition of the whole (original) region 40 into 4 subregions. The next "1" represents the partition of the top-left quadrant 41 of the original region into 4 subregions. The next four "0"'s represent the fact that these latter subregions of region 41 are leaf nodes, and not partitioned. The following two 0's represent that the top right and bottom left quadrants of the original region are leaf nodes. Finally the remaining bits 101000000 represent the partitioning structure of the bottom right quadrant 42 of the original region.

With each leaf node of the quadtree is an associated quantiser. It is possible to simply code a quantisation parameter for each leaf node in the order in which the leaf node occurs in the quadtree. Having decoded the quadtree representation the decoder can then calculate the ordering and decode each quantisation parameter in sequence.

The preferred process of quantisation includes using uniform quantisation with a dead-zone. The discrete wavelet transform coefficients are quantised to integer values. Let c represent a coefficient value, d its quantised value and let q be the quantisation parameter for the region in which the coefficient lies. Then the quantisation can be defined as, $$d = fix\left(\frac{c}{q}\right)$$

where fix is defined by, $$fix(x) = \begin{cases} \lfloor x \rfloor & x \geq 0 \\ \lceil x \rceil & x \leq 0 \end{cases}$$

and $\lfloor \ \rfloor$ is the usual "floor" round down to nearest integer operator and $\lceil \ \rceil$ is the usual "roof" round up to nearest integer operator. The quantisation parameter q is the quantisation factor. At the encoder each coefficient in a subband is quantised to an integer value using this equation.

The inverse quantisation is given by, $$\hat{c} = q \times d + sign(d) \times \frac{q}{2}$$

where, $$sign(d) = \begin{cases} -1 & d < 0 \\ 0 & d = 0 \\ 1 & d > 0 \end{cases}$$

At the decoder each coefficient is inverse quantised using this inverse quantisation equation.

For a given rate, of say R bits per pixel (bpp), the best quantisation quadtree and associated quantisation factors can be defined as the quadtree that results in a compressed image with minimum distortion. That is compressing the image to R bpp, or to a lower rate, results in a higher distortion when using any other quadtree. The set of possible quantisation factors is presumed to be a fixed finite set. In the present case a set of 16 possible quantisation scale factors ranging from 1 to 16 have been used. With 16 different possible quantisation scale factors, a simple code will require 4 bits to determine a given scale factor.

The method of finding the best such quadtree is naturally found using the Lagrange multiplier approach for constrained optimisation. That is for a given $\lambda > 0$, find $$\min[cost = d(Q) + \lambda b(Q)] \quad \text{(Eqn1)}$$

where the minimisation is over all quadtrees and associated quantisation factors. The quadtree and associated quantisation factors is represented in the equation as Q. Thus this minimisation is over all possible Q. If the optimum solution to the unconstrained Lagrangian problem is given by Q* then Q* is the optimum solution to the constrained solution in the case where the given rate is b(Q*). To find the optimum solution for a given rate it is possible to simply vary $\lambda$ using a bisection method until b(Q*) is sufficiently close to the desired rate R.

The method used to perform the minimisation in Eqn1 for a given image region is illustrated in the following pseudo code:

[bits, distortion, $n_{max}$]=findQuantisationQuadtree (region, n, $\lambda$)

```
{
*/
**Find the optimum fixed quantisation factor for the region
*/
[bits, distortion, q] = findOptimumFixedQuantisation (region, n, λ);
set fixedQuantisationCost = distortion + λ bits;
/*
**Find the cost of using quadtree variable quantisation on the region
**q_min is the smallest quantisation factor
*/
set n_max = largest bit number in region quantised with q_min;
partition region into 4 subregions;
[bits1, distortion], n_max1] = findQuantisationQuadtree region1,
n_max, λ);
[bits2, distortion2, n_max2] = findQuantisationQuadtree region2,
n_max, λ);
[bits3, distortion3, n_max3] = findQuantisationQuadtree region3,
n_max, λ);
(bits4, distortion4, n_max4] = findQuantisationQuadtree region4,
n_max, λ);
set bitSavings = 3 × (n_max - (n_max1, n_max2, n_max3, n_max4);
set variableQuantisationCost = distortion1 + distortion2 +
distortion3 + distortion4 + λ (bits1 + bits2 + bits3 + bits4 +
(n-n_max + 1) - bitSavings + 1);
/*
**Find the better approach - variable or fixed quantisation.
*/
if variableQuantisationCost < fixedQuantisationCost
{
    distortion = distortion1 + distortion2 + distortion3 + distortion4;
    bits = bits1 + bits2 + bits3 + bits4 + (n-n_max + 1) -
    bitSavings + 1;
    n_max = max(n_max1, n_max2, n_max3, n_max4);
}
else // Fixed quantisation is better, (return parameters are
already set correctly)
{
    output region and quantisation factor q
}
}

[bits, distortion, q] = findOptimumFixedQuantisation (region, n, λ);
{
/*
**Find the quantisation factor with the least Lagrangian cost
*/
set cost = infinity;
loop through the quantisation factors q_i
{
    quantise region with quantisation factor q_i;
    bitsQ = SWEET code (region, n);
    set distortionQ to the quantisation distortion;
    if distortionQ + λbitsQ < cost
    {
        cost = distortionQ + λbitsQ
        bits = bitsQ;
        distortion = distortionQ;
        q = q_i;
    }
}
/*
**Add in the number of bits used to code the fixed quantisation
```

```
**factor and the termination bit for the quantisation quadtree
*/
    set bits = bits + numQuantisationFactorBits + 1;
}
```

In this code the set of (16) possible quantisation parameters is implicit.

In the findOptimumQuadtree function above, the optimum fixed quantisation factor to use for the whole region and its associated cost is calculated by calling the findOptimumFixedQuantisation function. Then the cost associated with using a quadtree variable quantisation on the region is calculated. This is performed by partitioning the region into four sub regions and recursively calling the findOptimumQuadtree function on each subregion. The fixed and variable quantisation costs are then compared and the solution with the minimum cost is selected. If fixed quantisation is selected then the region and associated quantisation factor are output. This output can then be used later to code the quadtree and associated quantisation factors, and to quantise the image regions prior to coding.

The $(n-n_{max}+1)$—bitSavings number of bits factor in the calculation of variableQuantisationCost in the function findOptimumQuadtree, is the number of extra bits that the SWEET coding method requires to code the four subregions given the bit number parameter n. The final extra bit added to the number of bits factor in the calculation of variableQuantisationCost is a 1 bit used to indicate the partition of the region in the quantisation quadtree.

In the findOptimumFixedQuantisation, the SWEET coding method is used to calculate the number of bits used to code a quantised region. The best quantisation factor is then found as the one that minimises the Lagrangian cost, distortion $+\lambda$bits. Finally to the total number of bits used to code the region, with the best quantisation factor, is added numQuantisationFactorBits, which is simply the number of bits required to code the quantisation factor (in our case this is 4 bits), and a single bit representing the 0 terminating bit in the quadtree indicating that the region is a leaf node. 0

2.1 Preferred Embodiment of Apparatus(s)

Figure 8:
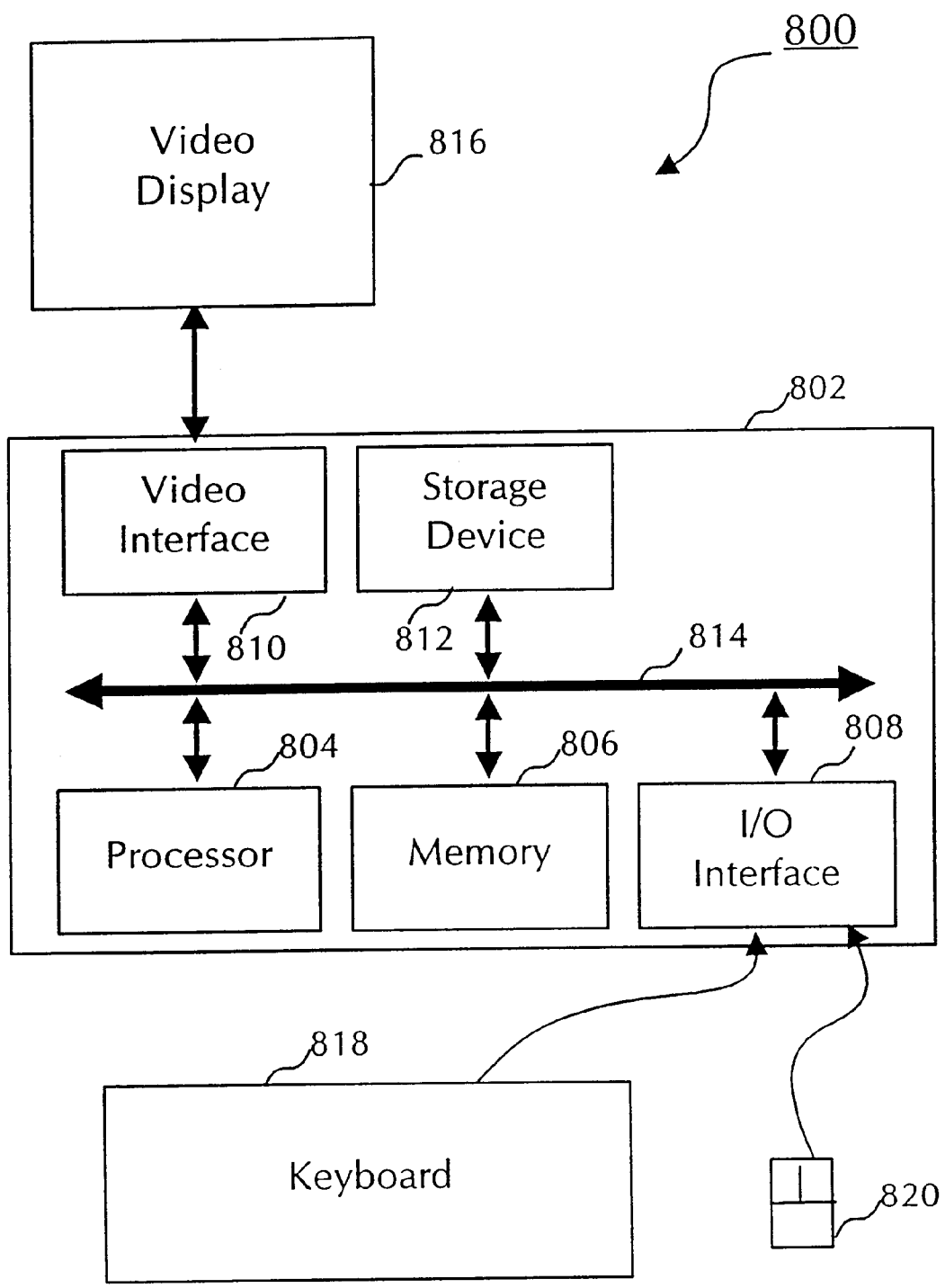
FIG. 8 is a block diagram of a general purpose computer.

The encoding and/or decoding processes are preferably practiced using a conventional general-purpose computer, such as the one shown in FIG. 8, wherein the processes of FIG. 16 or 17 may be implemented as software executing on the computer. In particular, the steps of the encoding and/or decoding methods are effected by instructions in the software that are carried out by the computer. The software may be divided into two separate parts; one part for carrying out the encoding and/or decoding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding and/or decoding coded representations of digital images in accordance with the embodiments of the invention.

The computer system 800 consists of the computer 802, a video display 816, and input devices 818, 820. In addition, the computer system 800 can have any of a number of other output devices including line printers, laser printers, plotters, and other reproduction devices connected to the computer 802. The computer system 800 can be connected to one or more other computers via a communication interface 808c using an appropriate communication channel 830 such as a modem communications path, a computer network, or the like. The computer network may include a local area network (LAN), a wide area network (WAN), an Intranet, and/or the Internet The computer 802 itself consists of a central processing unit(s) (simply referred to as a processor hereinafter) 804, a memory 806 which may include random access memory (RAM) and read-only memory (ROM), input/output (I/O) interfaces 808a, 808b & 808c, a video interface 810, and one or more storage devices generally represented by a block 812 in FIG. 8. The storage device(s) 812 can consist of one or more of the following: a floppy disc, a hard disc drive, a magneto-optical disc drive, CD-ROM, magnetic tape or any other of a number of non-volatile storage devices well known to those skilled in the art. Each of the components 804 to 812 is typically connected to one or more of the other devices via a bus 814 that in turn can consist of data, address, and control buses.

The video interface 810 is connected to the video display 816 and provides video signals from the computer 802 for display on the video display 816. User input to operate the computer 802 can be provided by one or more input devices 808b. For example, an operator can use the keyboard 818 and/or a pointing device such as the mouse 820 to provide input to the computer 802.

The system 800 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing is merely exemplary of the types of computers with which the embodiments of the invention may be practiced. Typically, the processes of the embodiments, described hereinafter, are resident as software or a program recorded on a hard disk drive (generally depicted as block 812 in FIG. 8) as the computer readable medium, and read and controlled using the processor 804. Intermediate storage of the program and pixel data and any data fetched from the network may be accomplished using the semiconductor memory 806, possibly in concert with the hard disk drive 812.

In some instances, the program may be supplied to the user encoded on a CD-ROM or a floppy disk (both generally depicted by block 812), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of coding and/or decoding may alternatively be implemented in dedicated hardware such as one or more integrated circuits performing the functions or sub functions of the encoding and decoding. Such dedicated hardware may include graphic processors, digital signal processors, or one or more microprocessors and associated memories.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

What is claimed is:

1. A method of compressing digital data including the steps of:
   (a) transforming said data utilising a discrete wavelet transform to produce corresponding transformed data;
   (b) quantising said transformed data utilising a variable quantisation determined by a corresponding quadtree structure wherein each of said quadtree leaf nodes has an associated quantisation factor utilised in said quantising of said transformed data.

2. A method as claimed in claim 1 wherein said quadtree is determined to be an optimum in a rate distortion sense.

3. A method as claimed in claim 1 wherein said quadtree is encoded utilising a binary prefix notation followed by a list of quantisation factors.

4. A method as claimed in claim 2 wherein the method of Lagrange multipliers is utilised to determine said optimum.

5. A method as claimed in claim 4 wherein said optimum is optimised for a predetermined bits per data item.

6. A method as claimed in claim 1, wherein said digital data includes image data.

7. A method as claimed in claim 1, wherein said digital data includes video data.

8. A method as claimed in claim 7 wherein said video data includes frame difference data.

9. A method of decompressing digital data, which digital data includes encoded quantized coefficients and associated quantization and quadtree information, the method including the steps of
   (a) decoding said quantization and quadtree information;
   (b) decoding said encoded quantized coefficents
   (c) inverse quantizing the decoded quantized coefficients in accordance with the quantization and quadtree information, wherein each quadtree leaf node has an associated quantization factor utilised in said inverse quantising of said decoded quantized coefficients; and
   (d) inverse transforming the inverse quantized coefficients.

10. A method as claimed in claim 9, wherein said digital data includes image data.

11. A method as claimed in claim 9, wherein said digital data includes video data.

12. A method as claimed in claim 11, wherein said video data includes frame difference data.

13. An apparatus for compressing digital data including the apparatus including:
   transformation means for transforming said data utilising a discrete wavelet transform to produce corresponding transformed data;
   quantization means for quantizing said transformed data utilising a variable quantisation determined by a corresponding quadtree structure wherein each of said quadtree leaf nodes has an associated quantisation factor utilised in said quantising of said transformed data.

14. An apparatus as claimed in claim 13 wherein said quadtree is determined to be an optimum in a rate distortion sense.

15. An apparatus as claimed in claim 13 wherein said quadtree is encoded utilising a binary prefix notation followed by a list of quantisation factors.

16. An apparatus as claimed in claim 15 wherein Lagrange multipliers is utilised to determine said optimum.

17. An apparatus as claimed in claim 16 wherein said optimum is optimised for a predetermined bits per data item.

18. An apparatus as claimed in claim 13, wherein said digital data includes image data.

19. An apparatus as claimed in claim 13, wherein said digital data includes video data.

20. An apparatus as claimed in claim 19, wherein said video data includes frame difference data.

21. An apparatus for decompressing digital data, which digital data includes encoded quantized coefficients and associated quantization and quadtree information, the apparatus including;
   means for decoding said quantization and quadtree information;
   means for decoding said encoded quantized coefficents
   means for inverse quantizing the decoded quantized coefficients in accordance with the quantization and quadtree information, wherein each quadtree leaf node has an, associated quantization factor utilised in said inverse quantising of said decoded quantized coefficients; and
   means for inverse transforming the inverse quantized coefficients.

22. An apparatus as claimed in claim 21, wherein said digital data includes image data.

23. An apparatus as claimed in claim 21, wherein said digital data includes video data.

24. An apparatus as claimed in claim 23, wherein said video data includes frame difference data.

25. A computer program product including a computer readable medium having recorded thereon a computer program for compressing digital data, the computer program product including:
   transformation means for transforming said data utilising a discrete wavelet transform to produce corresponding transformed data;
   quantization means for quantizing said transformed data utilising a variable quantisation determined by a corresponding quadtree structure wherein each of said quadtree leaf nodes has an associated quantisation factor utilised in said quantising of said transformed data.

26. A computer program product as claimed in claim 25 wherein said quadtree is determined to be an optimum in a rate distortion sense.

27. A computer program product as claimed in claim 25 wherein said quadtree is encoded utilising a binary prefix notation followed by a list of quantisation factors.

28. A computer program product as claimed in claim 27 wherein Lagrange multipliers is utilised to determine said optimum.

29. A computer program product as claimed in claim 28 wherein said optimum is optimised for a predetermined bits per data item.

30. A computer program product as claimed in claim 25, wherein said digital data includes image data.

31. A computer program product as claimed in claim 25, wherein said digital data includes video data.

32. A computer program product as claimed in claim 31, wherein said video data includes frame difference data.

33. A computer program product including a computer readable medium having recorded thereon a computer program for decompressing digital data, which digital data includes encoded quantized coefficients and associated quantization and quadtree information, the computer program product including:

means for decoding said quantization and quadtree information;

means for decoding said encoded quantized coefficents means for inverse quantizing the decoded quantized coefficients in accordance with the quantization and quadtree information, wherein each quadtree leaf node has an associated quantization factor utilised in said inverse quantising of said decoded quantized coefficients; and means for inverse transforming the inverse quantized coefficients.

34. A computer program product as claimed in claim 33, wherein said digital data includes image data.

35. A computer program product as claimed in claim 33, wherein said digital data includes video data.

36. A computer program product as claimed in claim 35, wherein said video data includes frame difference data.

* * * * *